Jan. 12, 1926.
L. W. BUGBEE, JR
1,569,258
TRIFOCAL LENS BLANK AND LENS MADE THEREFROM
Filed April 13, 1925
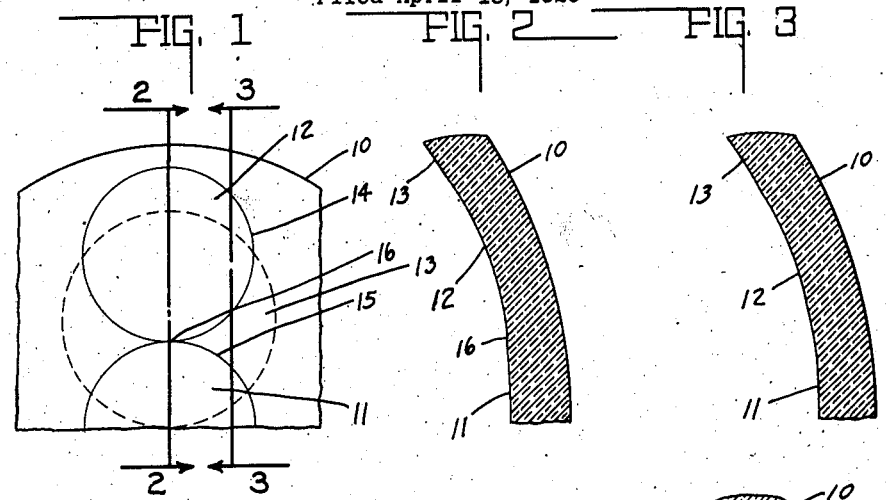
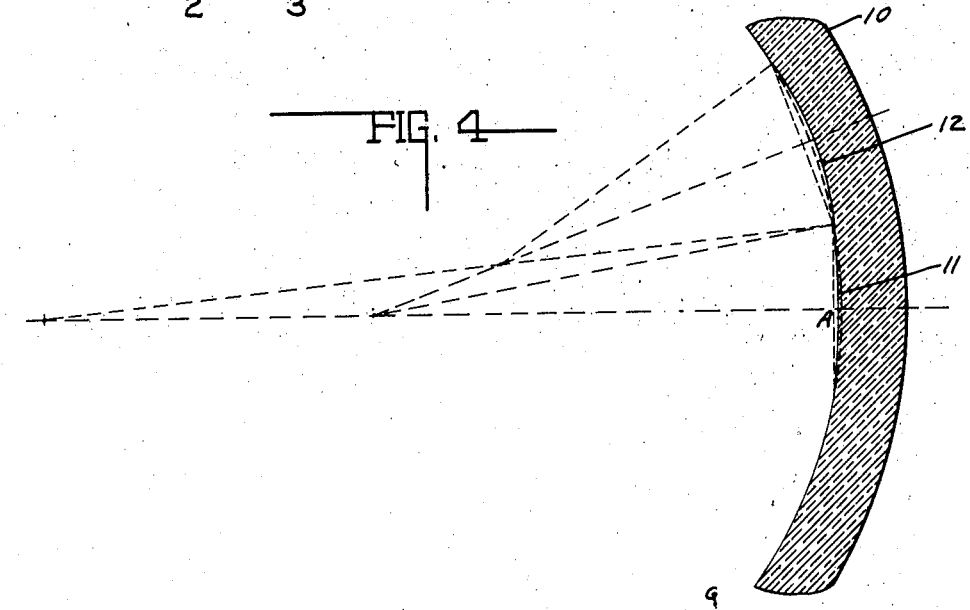
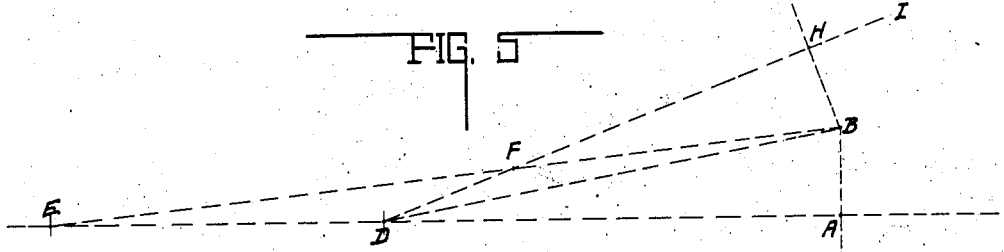
INVENTOR.
LUCIAN W. BUGBEE, JR.
BY
ATTORNEYS.

Patented Jan. 12, 1926.

1,569,258

UNITED STATES PATENT OFFICE.

LUCIAN W. BUGBEE, JR., OF INDIANAPOLIS, INDIANA, ASSIGNOR, BY MESNE ASSIGN-
MENTS, TO CONTINENTAL OPTICAL CORPORATION, OF NEW YORK, N. Y., A COR-
PORATION OF DELAWARE.

TRIFOCAL LENS BLANK AND LENS MADE THEREFROM.

Application filed April 13, 1925. Serial No. 22,710.

*To all whom it may concern:*

Be it known that I, LUCIAN W. BUGBEE, Jr., a citizen of the United States, and a resident of Indianapolis, county of Marion, and State of Indiana, have invented a certain new and useful Trifocal Lens Blank and Lens Made Therefrom; and I do hereby declare that the following is a full, clear, and exact description thereof, reference being had to the accompanying drawings, in which like numerals refer to like parts.

This invention relates to new and useful improvements in lenses, and particularly that type known as a trifocal lens, having areas suitable for far, intermediate and near distance vision.

The principal object of the invention is to construct and form a trifocal lens of this character from transparent material of substantially the same index of refraction throughout having merged lines of joinder, which lines will be substantially invisible when in position on the face of the wearer, or, in other words, eliminating the usual shoulder between at least two of the areas, and at the same time so constructing the areas with respect to each other and their lines of joinder as to cause no positional jump of the image when the eye passes from the upper to the lower visual areas of the lens across the point of joinder. This jump is a common defect of all types of so-called "invisible trifocal lenses", and it is sought to eliminate such positional jump of the image as well as the divisional shoulder so as to provide a so-called invisible trifocal.

Another feature of the invention resides in the construction of the blank or lens formed therefrom, wherein the lines of joinder are curved in opposite directions, substantially coincident at their point of nearest approach. This causes all three areas to merge into each other at a common point which not only serves as an important factor in the visual qualities and advantages of the lens, but in the manufacture and production thereof.

The full nature of the invention will be understood from the accompanying drawings and the following description and claims:

In the drawings, Figure 1 is a plan view of a lens blank showing the position of the visual areas with respect to each other. Fig. 2 is a section taken on the line 2—2 of Fig. 1. Fig. 3 is a section taken on the line 3—3 of Fig. 1. Fig. 4 is a diagrammatic illustration of the respective positions of the visual areas. Fig. 5 is an illustration of the graphical method of division.

In the drawings there is shown a blank 10 having formed thereon a near vision area 11, a distant vision area 12 and an intermediate vision area 13. The line of joinder of the distant vision area 12 with the near and intermediate areas is represented by 14, and curved upwardly. The line of joinder of the near vision area with the intermediate and distant areas is represented by the line 15 and curves downwardly. It will be noted that the oppositely curved lines of joinder 14 and 15 meet and coincide at the point 16, this being an essential feature of this invention. Accordingly there results a trifocal lens having the lines of joinder of the far and near areas merging at substantially one point, but curved away from each other so as to provide an intermediate area of the lens for intermediate distance vision.

It is recognized to be old in the art to so construct a trifocal lens of this general character having the lines of joinder of different areas substantially invisible or without any substantial groove or shoulder, as shown in the patent to Bugbee, No. 1,427,192, issued August 29, 1922. However in the lens disclosed by this patent, there is a distinct positional jump of the image as the eye passes from one area to the other. On the other hand, bifocal or trifocal lenses have been known for some time to have been made so that there would be no positional jump of the image when passing from one area to the other, but never without the provision of a shoulder or a clearly visible line of joinder. This type of lens may be illustrated by the patent to Cross, No. 1,415,318, issued May 9, 1922, and the patent to Tillyer, No. 1,406,782, issued February 14, 1922. In view of this and similar art, this invention contemplates eliminating both of these undesirable elements, i. e., the positional jump of the image, and the clearly visible line of joinder, and at the same time provide a practical trifocal lens which may be readily and conveniently manufactured from a blank composed of material having substantially the same optical properties throughout. This will give a highly perfected and desirable lens of the trifocal type.

In providing a method for the manufacture of a practical and commercial lens of this character, I find that if the radius of surface curvature of the intermediate portion were made a quantity such that twice its reciprocal value were equal to the sum of the reciprocal values of the radii of curvature of the far and near areas, that is, $$\frac{2}{R_2} = \frac{1}{R_3} + \frac{1}{R_1}$$

then the lines of joinder of the upper and lower areas remain constant and equal to each other in size, and also that the image jump at the point of joinder of the upper and the lower areas is substantially eliminated, provided that the radii of curvature of said areas have the same radial axis at the point of joinder. The condition for removing the jump of the image is, therefore, purely a geometrical and not an optical one. The cause of jump is removed before the lens is completed and is thus unaffected by the grinding of the opposite face of the blank to make the finished lens.

As shown in Fig. 4, the upper or distance area 12 has a radius of curvature of 61.8 mm. and the near area has a radius of curvature of 150.2 mm. The intermediate area 13 has a radius of curvature of 87.6 mm. This gives an addition of focal power from the upper to the lower areas of 5 diopters for ordinary spectacle glasses, which is substantially the highest powered reading addition met with in actual practice. At the point A on the principal axis a perpendicular line A B C is drawn equal to the diameter of the lower or reading area 11. The line A D E is drawn from the point A perpendicularly to the line A B C. From point B strike off the radius of curvature of the intermediate area 13 B D, and the near area 11 radius of curvature B E, and also the distance area 12 radius of curvature B F on the line B E. From points D, E and F the respective radii of curvature of said areas may be struck off. With these radii, as stated, it will be found that the distance area 12 is of the same size as the reading area 11. Furthermore, from the geometry of Fig. 5, it is apparent that the chord B C is the chord common to the circles of curvature of the intermediate and near areas 13 and 11, the center of curvature of the latter being on its perpendicular bisector A D E, and also since the chord B C is the chord common to the circles of curvature of the intermediate and distance areas, the centers of curvatures of said areas must lie on its perpendicular bisector D F H. This furnishes an easy method of design, whereby the proper relative positions of the respective areas to each other may be determined.

In producing the lens, several different methods may be employed, depending upon whether or not it is desired to make it of one piece of material or of several pieces having substantially the same optical properties throughout. If made of two pieces of material, it may be made in two ways, either the complete edge to edge insertion of one area into a suitable recess cut in the lens containing the other two areas, or by cementing a "wafer" of suitable power onto the face of a lens containing the other two areas. If made from one piece of material, as shown in Figs. 1 to 3, in which case the invention is most practical, it may be made by several methods which form no part of this invention. If made from glass and ground from a single piece thereof, the various visual areas of the lens may be ground or formed by rotating the tools, rings, laps or grinding stone in the usual manner, thereby making its manufacture easy and practical. The most preferable method of making the lens consists of grinding on one face of a single piece of glass of uniform refractive index throughout two surfaces or areas; the near distance area having a curvature suitable for providing the near focal power, the remainder of the area having a curvature suitable to produce the desired focal power for intermediate use. The grinding and polishing of these two areas 11 and 13 may be effected by processes long known to the art and commonly used in the manufacture of one piece bifocal lenses. These two areas may be provided simultaneously or successively as desired. They may be ground simultaneously by use of a "target" or "saucer-shaped" glass disk caused to rotate against the rotating ring, lap, tool or grinding stone with two grinding surfaces thereon of curvatures corresponding to the areas to be generated, thus making lines of joinder of the two visual areas merge smoothly, the said two visual areas being capable of production by concentric grinding.

After the visual areas 11 and 13 have been produced on the blank, as previously described, in accordance with the present practice, the far distance or upper area 12 may thereafter be generated by grinding away the upper portion of said blank to such curvature as will provide the lens made therefrom with a visual area of focal power suitable for far distance vision. This area is preferably produced by the use of a rotating tool, lap or grinding wheel where the lens is to be made of glass, safeguarding the other areas by a coating of protective material such as shellac. In the use of a transparent material suitable for molding, all three visual areas may be produced simultaneously or separately, as may be the desire, by the use of suitable molds or dies.

It will be noted from the diagrammatical layout above described that in order that the lens may be free from any jump at the point of joinder of the upper and lower areas, it is essential that these areas be ground with such curvatures and sizes as to accord with certain defined conditions, as shown in Figs. 4 and 5. It will be noted that the radius of curvature F B of the area 12 at its point of joinder with the areas 11 and 13 is coincident in direction with the radius of curvature E B of the area 11 at its line of joinder, said radius of curvature at the line of joinder of both areas forming the straight line E F B, known as the radial axis. Consequently as the line of vision approaches the line of joinder, the image will be seen along the line of the coincident radius of curvature of both areas, and accordingly eliminate any variation in position as the eye passes from one area to the other, since by well known optical principles, a ray proceeding along a radius of curvature of a spherical surface is undeviated by refraction at that surface. This construction results in a tilting of the areas towards each other which is referred to in the patent to Tillyer above mentioned. However, due to the construction of the lens and the respective positions of the three fields of vision, their respective surfaces will merge one into the other so as to eliminate any shoulder or clearly visible line of joinder to present a substantial invisible line of joinder therebetween. It will be clearly observed that the line of joinder between the near and distant visual areas as at 10 will merge without shoulder or interruption, and the remaining portions of the lines of joinder of the near and distant areas will similarly merge into the intermediate area 13 so that there will be no shoulder or visible interruption between their surfaces.

I, therefore, have a trifocal lens blank and lens made therefrom which in the commonly used form and powers of such lenses substantially possesses invisibility of dividing line, which is a requirement essential for high grade lenses; freedom from positional image jump from upper to lower areas; freedom from objectionable color fringes; freedom from objectionable prismatic effects; and freedom from astigmatism of oblique penals.

Furthermore, this invention embraces slight variations from the theoretical conditions above set forth, since there may be in the manufacture thereof a slight jump of the image before it becomes objectionable, wherein the manufacture departs slightly from the theoretical conditions. But it should reasonably be expected to come within a range of substantially twenty percent departure on each side of the theoretical condition before the jump of the image becomes so great as to depart from the spirit and scope of this invention.

The invention claimed is:

1. A trifocal lens having a far distance area, an intermediate distance area, and a near distance area, the lines of joinder of said areas being curved in opposite directions, the upper and lower areas being so tilted relative to each other as to have a common radial axis at the point of joinder therebetween.

2. A trifocal lens having a far distance area, an intermediate distance area, and a near distance area, the lines of joinder of said areas being curved in opposite directions but substantially coincident at their point of nearest approach to each other, the upper and lower areas being so tilted relative to each other that they have a common radial axis at the point of joinder therebetween.

3. A trifocal lens composed of material of substantially the same optical properties throughout, and having a far distance area, an intermediate distance area, and a near distance area, the radii of curvatures of said areas being so related that twice the reciprocal value of the radius of the curvature of the intermediate area is mathematically equal to the combined sum of the reciprocal values of the radii of curvature of the upper and lower areas.

4. A trifocal lens composed of material of substantially the same optical properties throughout, and having a far distance area, an intermediate distance area, and a near distance area with the lines of joinder of said areas curved in opposite directions but coincident at their points of nearest approach to each other, the upper and lower areas being so tilted relative to each other so as to have a common radial axis at the point of joinder, and the radii of curvatures of said areas being so related that twice the reciprocal value of the radius of curvature of the intermediate area is mathematically equal to the combined sum of the reciprocal values of the radii of curvature of the upper and lower areas.

5. A trifocal lens having a far distance area, an intermediate distance area, and a near distance area, the lines of joinder of said areas being curved away from each other and substantially coincident at the point of nearest approach, the upper and lower areas being so tilted relative to each other as to have a common radial axis at the point of joinder therebetween, said blank and lens being so formed that their respective areas merge into each other throughout the entire extent of their lines of joinder without any substantial interruption.

6. A trifocal lens having a far distance area, an intermediate distance area, and a near distance area with the lines of joinder thereof curved away from each other, said far and near distance areas meeting at a given point, whereby said lines of joinder will be coincident at said point, said areas being so tilted relative to each other as to have a common radial axis at said point of meeting so as to substantially eliminate positional jump of the image from upper to lower areas across point of joinder, the intermediate distance area being separated by said point of meeting and merging into said other areas along their respective lines of joinder without any substantial interruption so as to render said lines of joinder between all of said areas substantially invisible.

In witness whereof, I have hereunto affixed my signature.

LUCIAN W. BUGBEE, Jr.